(12) United States Patent
Zimmerman

(10) Patent No.: US 11,469,537 B2
(45) Date of Patent: Oct. 11, 2022

(54) JUMPER CABLE ASSEMBLY

(71) Applicant: CommScope Technologies LLC, Hickory, NC (US)

(72) Inventor: Martin Zimmerman, Chicago, IL (US)

(73) Assignee: CommScope Technologies LLC, Hickory, NC (US)

( * ) Notice: Subject to any disclaimer, the term of this patent is extended or adjusted under 35 U.S.C. 154(b) by 120 days.

(21) Appl. No.: 16/998,314

(22) Filed: Aug. 20, 2020

(65) Prior Publication Data

US 2021/0057844 A1 Feb. 25, 2021

Related U.S. Application Data

(60) Provisional application No. 62/889,641, filed on Aug. 21, 2019.

(51) Int. Cl.
| | | |
|---|---|---|
| *H01R 13/518* | (2006.01) | |
| *H01R 24/52* | (2011.01) | |
| *H04W 88/08* | (2009.01) | |
| *H01Q 1/24* | (2006.01) | |
| *H01R 103/00* | (2006.01) | |

(52) U.S. Cl.
CPC .......... *H01R 13/518* (2013.01); *H01Q 1/246* (2013.01); *H01R 24/52* (2013.01); *H04W 88/085* (2013.01); *H01R 2103/00* (2013.01); *H01R 2201/02* (2013.01); *H01R 2201/24* (2013.01)

(58) Field of Classification Search
CPC .... H01R 13/518; H01R 24/52; H01R 88/085; H01R 2013/00; H01R 2201/02; H01R 2201/24; H01Q 1/1246; H04W 88/085

USPC .......................................................... 455/561
See application file for complete search history.

(56) References Cited

U.S. PATENT DOCUMENTS

| | | | |
|---|---|---|---|
| 9,356,382 B2 * | 5/2016 | Colapietro | H01R 13/46 |
| 9,450,351 B2 * | 9/2016 | Colapietro | F16M 13/02 |
| 9,472,928 B2 | 10/2016 | Paynter | |
| 9,807,760 B2 * | 10/2017 | Notargiacomo | H04W 16/18 |
| 9,997,825 B2 * | 6/2018 | Hendrix | H01Q 1/42 |
| 10,218,046 B2 * | 2/2019 | Hendrix | H04Q 1/08 |
| 10,390,386 B2 * | 8/2019 | Hendrix | H05K 7/20563 |
| 10,930,996 B2 * | 2/2021 | Hendrix | H04Q 1/118 |
| 2012/0206885 A1 * | 8/2012 | Pan | H04B 1/38 |
| | | | 361/737 |

(Continued)

FOREIGN PATENT DOCUMENTS

| | | |
|---|---|---|
| KR | 20190086163 A | 7/2019 |
| KR | 20190092775 A | 8/2019 |

(Continued)

OTHER PUBLICATIONS

"International Search Report corresponding to International Application No. PCT/US2020/046887 dated Nov. 27, 2020".

*Primary Examiner* — Hai V Nguyen
(74) *Attorney, Agent, or Firm* — Myers Bigel, P.A.

(57) ABSTRACT

A jumper cable assembly includes: a plurality of jumper cables, each having a first end terminated in a first connector and a second end terminated in a second connector; and a first mounting structure, the first connectors being mounted in the first mounting structure in a fixed arrangement relative to each other, the arrangement matching an arrangement of connectors of one of an antenna and a piece of cellular equipment to facilitate installation of the jumper cable assembly.

20 Claims, 4 Drawing Sheets

(56) References Cited

U.S. PATENT DOCUMENTS

| | | | | |
|---|---|---|---|---|
| 2014/0179244 A1* | 6/2014 | Colapietro | ............. | H01Q 1/246 |
| | | | | 455/90.2 |
| 2014/0315408 A1* | 10/2014 | Colapietro | ........... | H01Q 1/1228 |
| | | | | 439/247 |
| 2015/0017937 A1* | 1/2015 | Colapietro | ............. | H01Q 1/246 |
| | | | | 455/128 |
| 2016/0043515 A1* | 2/2016 | Colapietro | ............. | H01Q 1/246 |
| | | | | 439/529 |
| 2018/0026327 A1* | 1/2018 | Hendrix | ............... | H01Q 1/1228 |
| | | | | 455/562.1 |
| 2018/0176985 A1* | 6/2018 | Hendrix | ............. | H05K 7/20563 |
| 2018/0254545 A1 | 9/2018 | Hendrix et al. | | |
| 2019/0190116 A1* | 6/2019 | Hendrix | ............... | H01Q 1/1228 |
| 2020/0182441 A1* | 6/2020 | Girouard | ................. | F21V 29/60 |
| 2021/0057844 A1* | 2/2021 | Zimmerman | ........ | H01Q 1/1242 |

FOREIGN PATENT DOCUMENTS

| | | | | | |
|---|---|---|---|---|---|
| WO | | 2015026528 A2 | 2/2015 | | |
| WO | WO-2015026528 A2 * | | 2/2015 | ............. | E04H 12/00 |

\* cited by examiner

JUMPER CABLE ASSEMBLY

RELATED APPLICATION

The present application claims priority from and the benefit of U.S. Provisional Patent Application No. 62/889,641, filed Aug. 21, 2019, the disclosure of which is hereby incorporated herein by reference in its entirety.

FIELD OF THE INVENTION

The present invention relates generally to wireless communications, and in particular to wireless base station antenna and radio deployments.

BACKGROUND

A traditional installation of a wireless radio network system mounted at the top of the tower consists of a remote radio unit (RRU) and a separate antenna. These components are mounted in separate locations and are cabled together using jumper cables to pass the radio frequency (RF) signal between them. A single RRU typically includes multiple ports, as does a typical antenna. In some cases, multiple RRUs are connected to a particular antenna, while in other cases only a single RRU may be connected to the antenna. In either case, it is typically necessary for each port on the RRU to be connected with a specific port on the antenna for proper operation of the radio. The need to "match" the RRU ports with the antenna ports when connecting the jumper cables can create complex and time consuming installations, and can introduce opportunities for installation errors.

Current installations typically require multiple jumper cables and multiple mounting kits/hardware. This may involves more installation time (approximately 12-15 hours per site). As such, it may be desirable to reduce installation time and improve accuracy.

SUMMARY

As a first aspect, embodiments of the invention are directed to a jumper cable assembly. The assembly comprises: a plurality of jumper cables, each having a first end terminated in a first connector and a second end terminated in a second connector; and a first mounting structure, the first connectors being mounted in the first mounting structure in a fixed arrangement relative to each other, the arrangement matching an arrangement of connectors of one of an antenna and a piece of cellular equipment to facilitate installation of the jumper cable assembly.

As a second aspect, embodiments of the invention are directed to a jumper cable assembly comprising: a plurality of jumper cables, each having a first end terminated in a first connector and a second end terminated in a second connector; a first mounting structure, the first connectors being mounted in the first mounting structure in a fixed arrangement relative to each other, the arrangement matching an arrangement of connectors of an antenna to facilitate installation of the jumper cable assembly; and a second mounting structure, the second connectors being mounted in the second mounting structure in a fixed arrangement relative to each other, the arrangement matching an arrangement of connectors of a piece of cellular equipment.

As a third aspect, embodiments of the invention are directed to a cellular assembly comprising: an antenna; a piece of cellular equipment; and a jumper cable assembly. The jumper cable assembly comprises: a plurality of jumper cables, each having a first end terminated in a first connector and a second end terminated in a second connector; and a first mounting structure, the first connectors being mounted in the first mounting structure in a fixed arrangement relative to each other, the arrangement matching an arrangement of and are mounted to connectors of one of the antenna and the piece of cellular equipment to facilitate installation of the jumper cable assembly.

DETAILED DESCRIPTION

Figure 1:
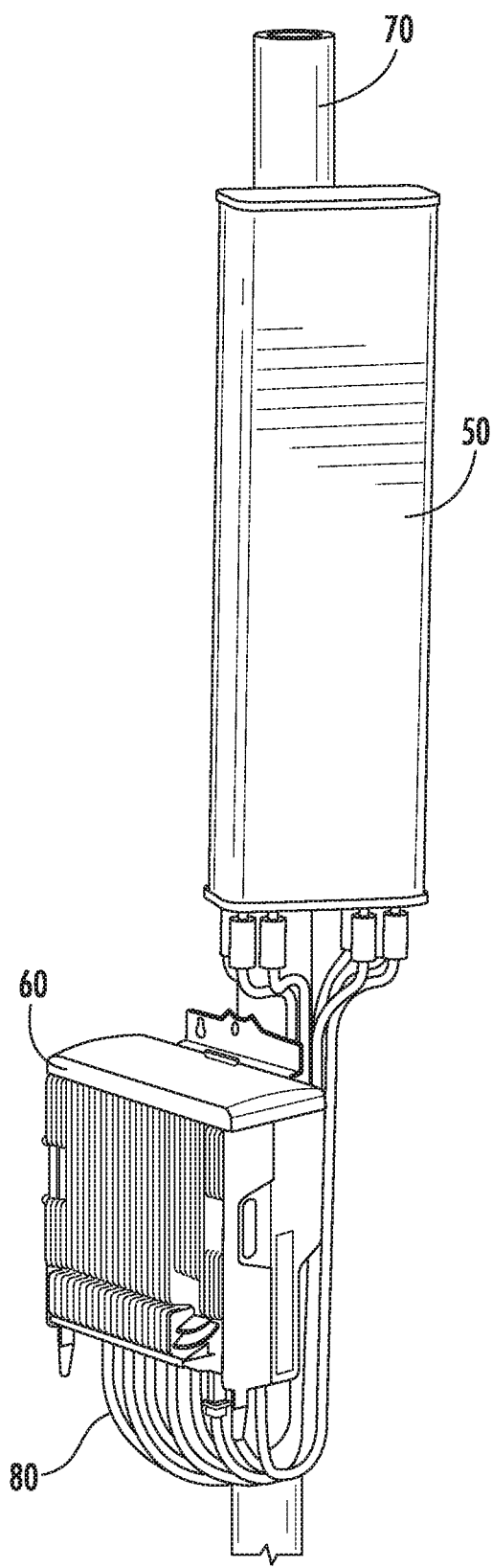
FIG. 1 is a perspective view of an antenna and an RRH mounted to a pole.

The present invention now is described more fully hereinafter with reference to the accompanying drawings, in which embodiments of the invention are shown. This invention may, however, be embodied in many different forms and should not be construed as limited to the embodiments set forth herein; rather, these embodiments are provided so that this disclosure will be thorough and complete, and will fully convey the scope of the invention to those skilled in the art.

Like numbers refer to like elements throughout. In the figures, the thickness of certain lines, layers, components, elements or features may be exaggerated for clarity.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof. As used herein, the term "and/or" includes any and all combinations of one or more of the associated listed items. As used herein, phrases such as "between X and Y" and "between about X and Y" should be interpreted to include X and Y. As used herein, phrases such as "between about X and Y" mean "between about X and about Y." As used herein, phrases such as "from about X to Y" mean "from about X to about Y."

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the specification and relevant art and should not be interpreted in an idealized or overly formal sense unless expressly so defined herein. Well-known functions or constructions may not be described in detail for brevity and/or clarity.

It will be understood that when an element is referred to as being "on", "attached" to, "connected" to, "coupled" with, "contacting", etc., another element, it can be directly on, attached to, connected to, coupled with or contacting the other element or intervening elements may also be present. In contrast, when an element is referred to as being, for example, "directly on", "directly attached" to, "directly connected" to, "directly coupled" with or "directly contacting" another element, there are no intervening elements present. It will also be appreciated by those of skill in the art that references to a structure or feature that is disposed "adjacent" another feature may have portions that overlap or underlie the adjacent feature.

Referring now to the drawings, FIG. 1 illustrates an antenna 50 mounted on a pole 70. An RRH 60 is also mounted to the pole 70 near the antenna 50. Jumper cables 80 are connected between connectors located on the underside of the RRH 60 and connectors located on the underside of the antenna 50. As can be seen in FIG. 1, a separate jumper cable 80 is connected between a respective RRH connector and a respective antenna connector.

Figure 2:
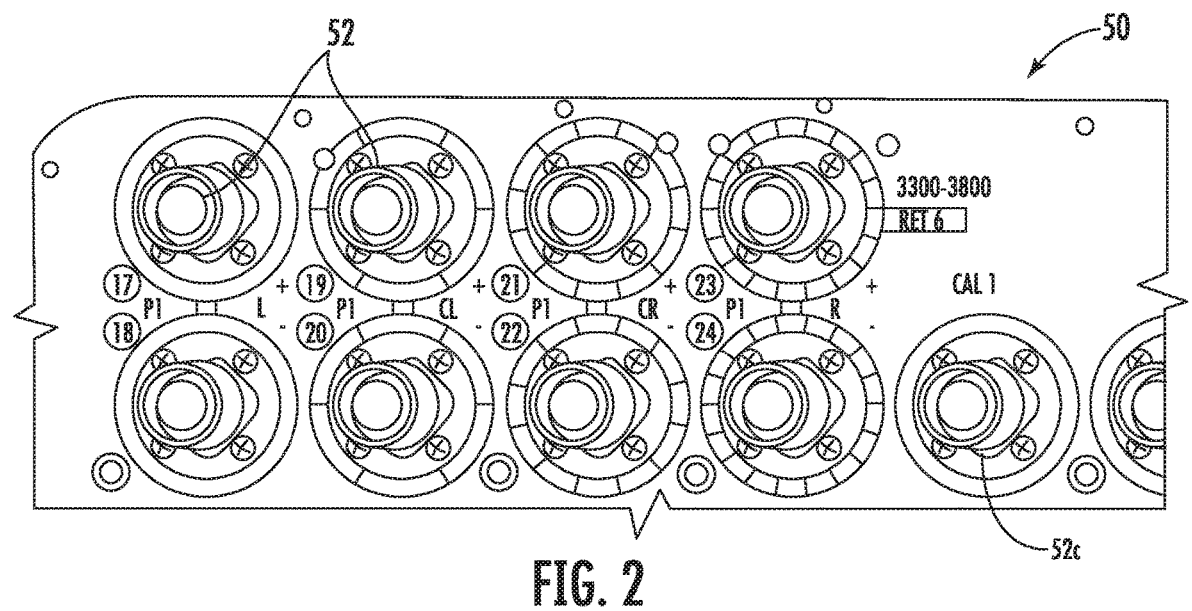
FIG. 2 is a bottom view of a portion of an exemplary antenna.
Figure 3:
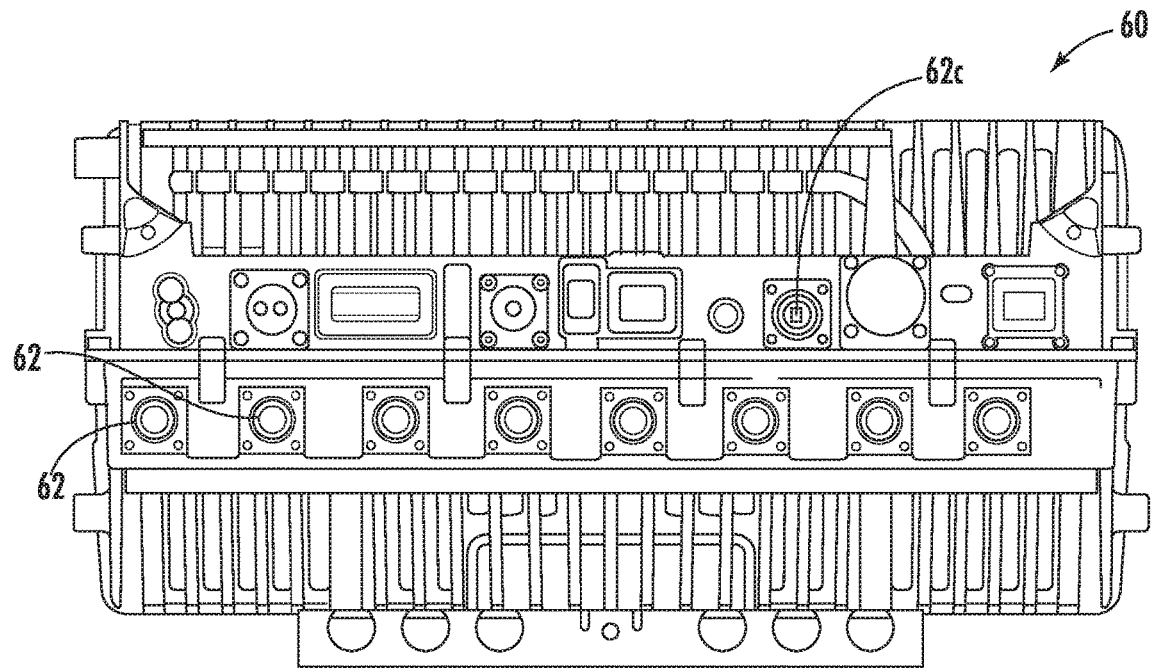
FIG. 3 is bottom view of an exemplary RRH.

An exemplary pattern of antenna connectors 52 is shown in FIG. 2; eight connectors 52 are arranged in a 4×2 matrix, and a ninth connector 52c is located to one side of one row of the connectors 52. An exemplary pattern of RRH connectors 62 is shown in FIG. 3; eight connectors 62 are arranged as a single row, with a ninth connector 62c located above the row.

Figure 6:
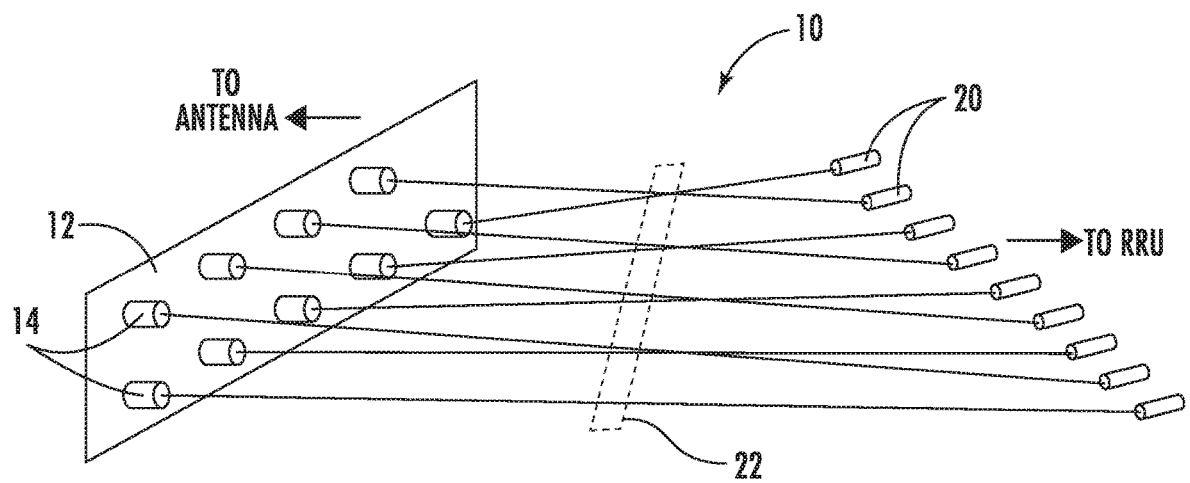
FIG. 6 is a schematic perspective view of a jumper cable assembly according to embodiments of the invention.

As discussed above, each of the RRH connectors 62 should be connected via a jumper cable with a specific antenna connector 52. An integrated jumper cable-connector assembly, designated broadly at 10, that can facilitate installation is shown in FIG. 6. The assembly 10 includes a plate 12 on which nine connectors 14 are mounted in a designated pattern. The pattern matches the pattern of the connectors of an antenna (such as the connectors 52 of the antenna 50).

The plate 12 may include mounting holes for mounting of the plate 12 on an antenna via bolts or the like; in other embodiments, the plate 12 may include latches, lugs, posts, or the like that enable the plate 12 to be mounted onto an antenna. The plate 12 may be formed of any suitable material, but in some embodiments may comprise a polymer or composite material; these materials may reduce or eliminate undesirable passive intermodulation (PIM) that can arise if metal components are employed adjacent antennas.

Figure 4:
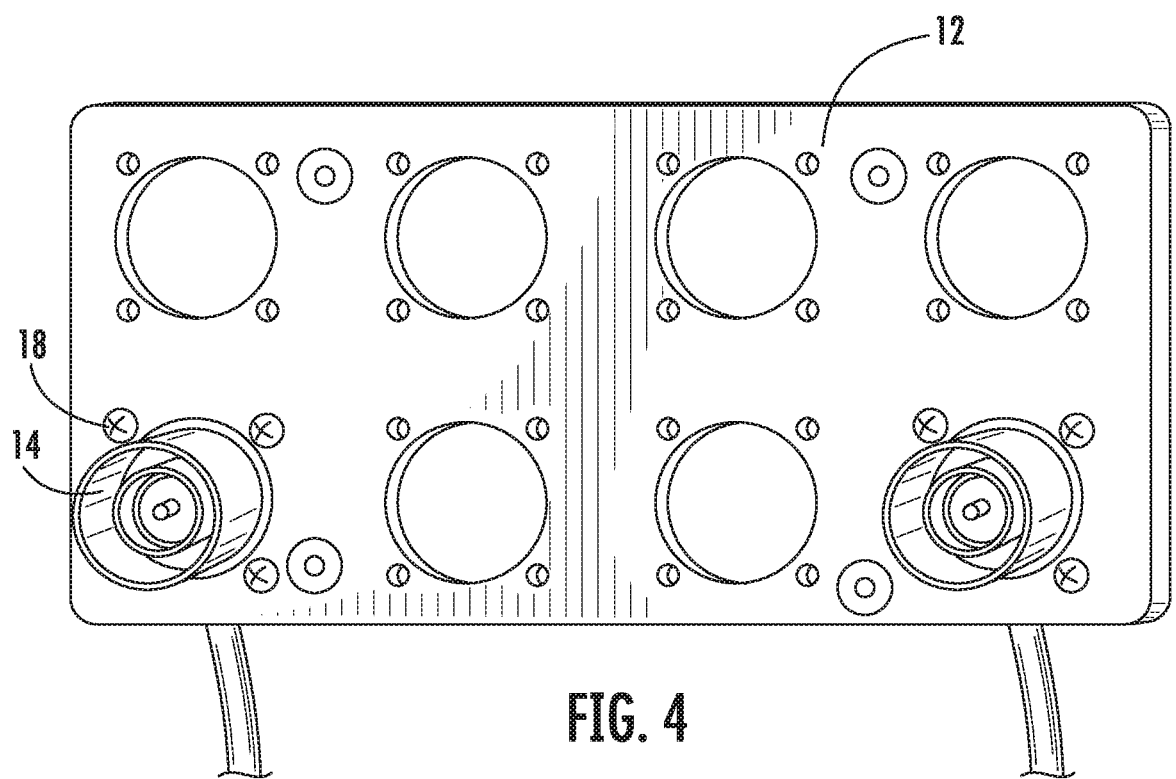
FIG. 4 is a front view of a mounting plate of the jumper assembly of FIG. 4 with two connectors mounted therein.
Figure 5:
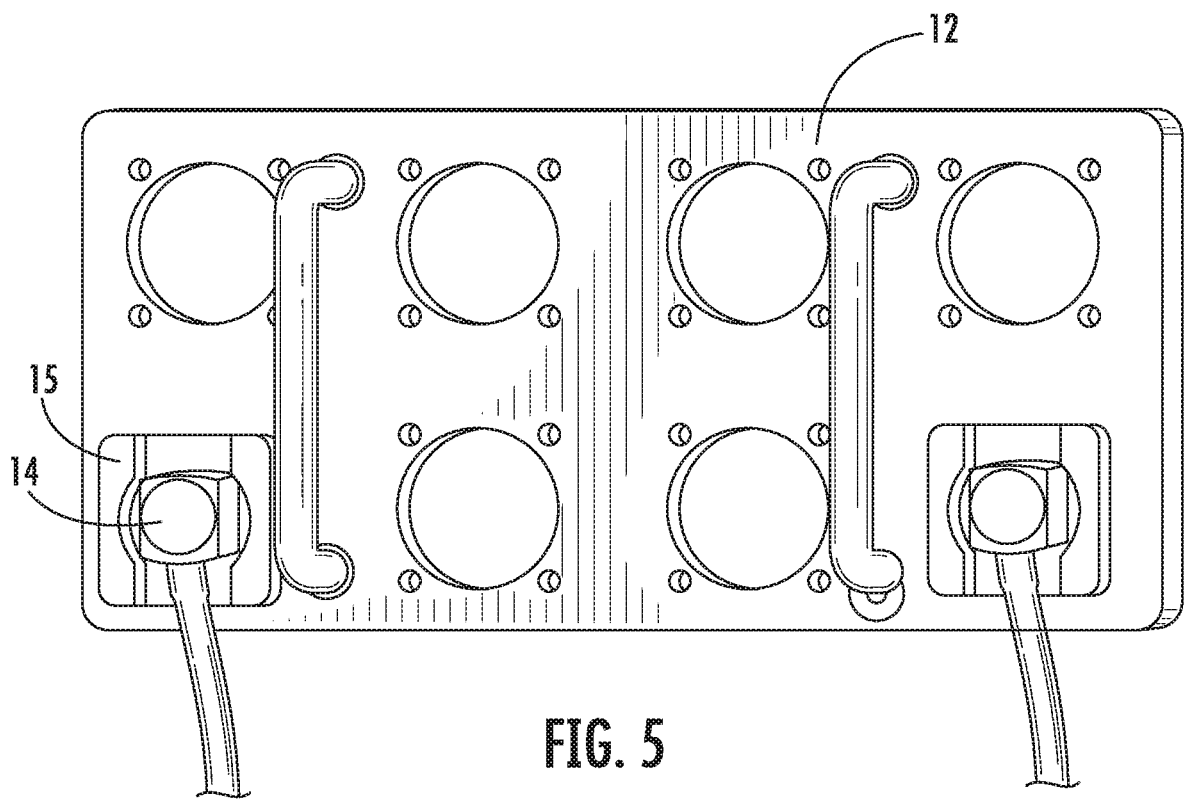
FIG. 5 is a rear view of the mounting plate of FIG. 5.

The connectors 14 may be of any configuration suitable for use with antennas, and in particular may be blind mate connectors. Exemplary connectors include those meeting the 4.3/10, 2.2/5, NEX10 and other conventions. The connectors may be configured for galvanic or capacitive coupling (see, e.g., U.S. Pat. No. 9,472,928 to Paynter for exemplary capacitive coupling connectors). As seen in FIGS. 4 and 5, typically the connectors 14 extend away from and normal to the plate 12; in the illustrated embodiment, each of the connectors 14 includes a flange 15 that enables the connector 14 to be mounted on the plate 12 via mounting screws 18.

The jumper cables 16 may be any cables known to be suitable for use to convey signals between an antenna and an RRU. Such cables may be sized from ¼ to ½ inch; typically, the cables 16 are supplied in lengths from about 0.5 m to about 5 m. Strain relief components may be present at the attachment locations between the cables 16 and their respective connectors.

As seen in FIG. 6, in some embodiments, the cables 16 may be bundled at one or more locations along their lengths. Exemplary bundling components include "twist ties" (designated at 22 in FIG. 6), straps, ribbons and the like. In some embodiments, the cables 16 may largely be encircled over most of their lengths with a jacket or sheath.

Figure 7:
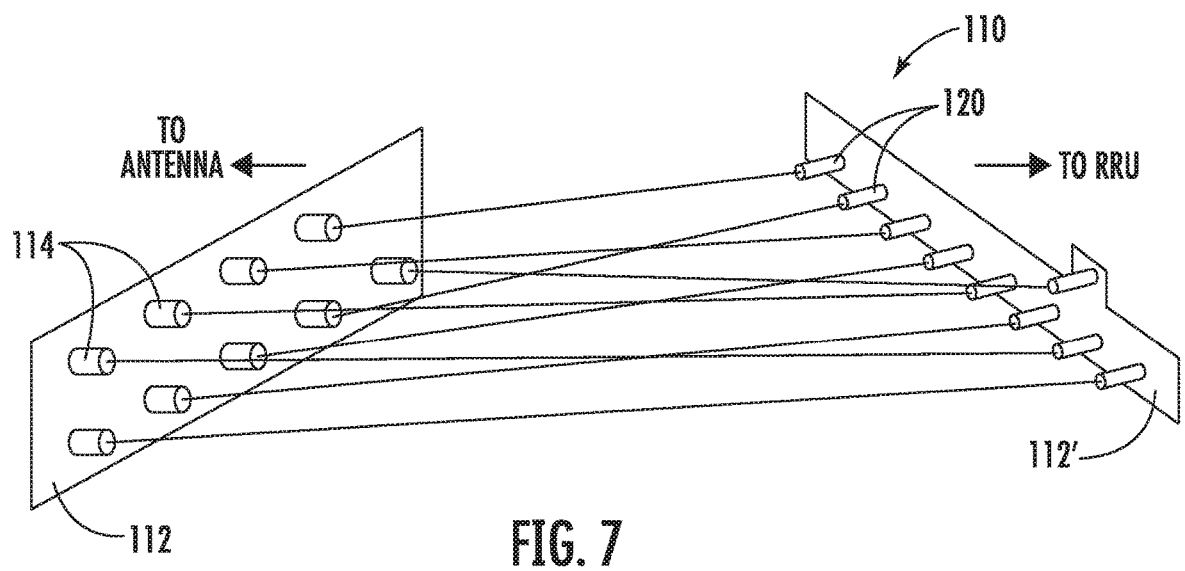
FIG. 7 is a schematic perspective view of a jumper cable assembly according to alternative embodiments of the invention.

As shown in FIG. 6, the assembly 10 includes connectors 20 at the ends of the cables 16 opposite the connectors 14. The connectors 20 may be any that are suitable for interfacing with an RRU. FIG. 6 depicts a configuration in which the connectors 20 are loosely arranged and free to move relative to each other. FIG. 7 illustrates an assembly 110 that is similar to the assembly 10, but which includes two plates 112, 112': the connectors 114 to be mounted to the antenna are mounted on the plate 112 in the manner described above, and the connectors 120 are mounted to the plate 112' in an arrangement suitable for mating with the ports of an RRU.

Assemblies as described above may facilitate installation/deployment of antennas and RRUs. In particular, the use in the assembly 10 of the plate 12 to mount the connectors 14 positions the connectors 14 in the proper locations for interconnection with the connectors of an antenna. Thus, each of the connectors 14 can be mated to the correct connector of the antenna, thereby avoiding mismating, and can be mated at the same time, which can save time in the mating process. The same is true for the assembly 110, which, by virtue of having connectors 114, 120 both mounted on plates 112, 112', can save time and ensure mating accuracy at both the antenna and the RRU.

It should also be understood that, in some embodiments, an assembly such as the assembly 10 that includes relatively fixed connectors on only one end of each jumper cable may be configured so that the fixed connectors are to be mounted to the RRU and the connectors that are free to move relative to each other are to be mounted to the antenna.

Those of skill in this art will appreciate that, although the assemblies 10, 110 each include eight connectors 14, 114, 120 on each end, the concepts discussed herein can be applied to other numbers of connectors as needed. One particularly popular arrangement is an "8-port" arrangement that actually has 9 connectors: eight of which carry signals, and the ninth of which serves as a calibration port. But assemblies including 12, 16, 32 or more connectors may also be employed. Exemplary antennas for use with the assemblies 10, 110 include CommScope Model No. RRZZT4S4-65B-R6. Exemplary RRUs include Band N78 (3.4-3.6 GHz) products available from Nokia, Ericsson, ZTE and HUawei.

In addition, it may be desirable to configure one or both plates 12, 112, 112' in such a manner that they can only be mated when in a specific orientation. This may be desirable if the arrangement of the connectors on the antenna and/or on the RRU is in some manner symmetric (e.g., a square or rectangle), such that the connectors 14, 114, 120 could otherwise be mated in multiple orientations (e.g., a square arrangement would otherwise permit for different orientations, a rectangular orientation would otherwise allow two orientations, etc.). A single orientation of one of the plates 12, 112, 112' (and therefore the connectors 14, 114, 120) can be imposed in a number of different ways. Examples include: a non-symmetric arrangement of mounting holes; a non-symmetric arrangement of latches, lugs, posts, pins and the like, and guides on the antenna that guide a trapezoidal, triangular or pentagonal plate. In other embodiments, the antenna and plate may have visual indicators (such as color) to direct the installer regarding the correct orientation. Other configurations may also be suitable for use with assemblies described herein.

Those of skill in this art will also appreciate that the antenna may be connected with cellular equipment rather than an RRU. Examples of other equipment to be connected to the antenna include filters, such as diplexers, tower mount amplifiers (TMAs) or Interference Mitigation Filters (IMFs).

Further, it should be understood that, although plates 12, 112, 112' are shown herein, other structures for mounting connectors in a fixed relationship to each other in a specific pattern may also be employed. For example, a housing within which a portion of each connector resides may be employed; such a housing may serve as, or be combined with, a weatherproofing component such as a sealing boot. As another example, a plate or panel with recesses or protrusions in or on which the connectors are mounted may be suitable.

The foregoing is illustrative of the present invention and is not to be construed as limiting thereof. Although exemplary embodiments of this invention have been described, those skilled in the art will readily appreciate that many modifications are possible in the exemplary embodiments without materially departing from the novel teachings and advantages of this invention. Accordingly, all such modifications are intended to be included within the scope of this invention as defined in the claims. The invention is defined by the following claims, with equivalents of the claims to be included therein.

That which is claimed is:

1. A jumper cable assembly, comprising:
   a plurality of jumper cables, each having a first end terminated in a first connector and a second end terminated in a second connector; and
   a first mounting structure, the first connectors being mounted in the first mounting structure in a fixed arrangement relative to each other, the arrangement matching an arrangement of connectors of one of an antenna and a piece of cellular equipment to facilitate installation of the jumper cable assembly.

2. The jumper cable assembly defined in claim 1, wherein the second connectors are mounted in a second mounting structure, the second connectors being mounted in the second mounting structure in a fixed arrangement relative to each other, the arrangement matching an arrangement of connectors of the other of the antenna and a piece of cellular equipment.

3. The jumper cable assembly defined in claim 1, wherein the first mounting structure is a plate.

4. The jumper cable assembly defined in claim 1, wherein the jumper cables are coaxial juniper cables.

5. The jumper cable assembly defined in claim 1, wherein the first and second connectors are blind-mate connectors.

6. The jumper cable assembly defined in claim 1, Where the first and second connectors are configured to meet a 4.3/10 interface specification.

7. The jumper cable assembly defined in claim 1, wherein the first connectors are connected with an antenna.

8. The jumper cable assembly defined in claim 1, wherein the piece of cellular equipment is an RRU, and wherein the first connectors are connected with the RRU.

9. A jumper cable assembly, comprising:
   a plurality of jumper cables, each having a first end terminated in a first connector and a second end terminated in a second connector;
   a first mounting structure, the first connectors being mounted in the first mounting structure in a fixed arrangement relative to each other, the arrangement matching an arrangement of connectors of an antenna to facilitate installation of the jumper cable assembly; and
   a second mounting structure, the second connectors being mounted in the second mounting structure in a fixed arrangement relative to each other, the arrangement matching an arrangement of connectors of a piece of cellular equipment.

10. The jumper cable assembly defined in claim 9, wherein the first mounting structure is a plate, and wherein the second mounting structure is a plate.

11. The jumper cable assembly defined in claim 9, wherein the jumper cables are coaxial jumper cables.

12. The juniper cable assembly defined in claim 9, wherein the first and second connectors are blind-mate connectors.

13. The jumper cable assembly defined in claim 9, where the first and second connectors are configured to meet a 4.3/10 interface specification.

14. The jumper cable assembly defined in claim 9, wherein the first connectors are connected with an antenna.

15. The jumper cable assembly defined in claim 9, wherein the piece of cellular equipment is an RRU, and wherein the second connectors are connected with the RRU.

16. A cellular assembly, comprising:
    an antenna;
    a piece of cellular equipment; and
    a jumper cable assembly comprising:
       a plurality of jumper cables, each having a first end terminated in a first connector and a second end terminated in a second connector; and
       a first mounting structure, the first connectors being mounted in the first mounting structure in a fixed arrangement relative to each other, the arrangement matching an arrangement of and are mounted to connectors of one of the antenna and the piece of cellular equipment to facilitate installation of the jumper cable assembly.

17. The cellular assembly defined in claim 16, wherein the first connectors are mounted to the antenna.

18. The cellular assembly defined in claim 16, wherein the first connectors are mounted to the piece of cellular equipment.

19. The cellular assembly defined in claim 18, wherein the piece of cellular equipment is an RRU.

20. The cellular assembly defined in claim 16, wherein the second connectors are mounted in a second mounting structure, the second connectors being mounted in the second mounting structure in a fixed arrangement relative to each other, the arrangement matching an arrangement of and are mounted to connectors of the other of the antenna and a piece of cellular equipment.

* * * * *

UNITED STATES PATENT AND TRADEMARK OFFICE
CERTIFICATE OF CORRECTION

PATENT NO. : 11,469,537 B2
APPLICATION NO. : 16/998314
DATED : October 11, 2022
INVENTOR(S) : Martin Zimmerman It is certified that error appears in the above-identified patent and that said Letters Patent is hereby corrected as shown below:

In the Claims

Column 5, Line 48, Claim 4: Please correct "juniper" to read --jumper--

Column 6, Line 20, Claim 12: Please correct "juniper" to read --jumper--

Signed and Sealed this
Thirty-first Day of January, 2023

*Katherine Kelly Vidal*

Katherine Kelly Vidal
*Director of the United States Patent and Trademark Office*